(12) United States Patent
Nakatani et al.

(10) Patent No.: US 11,689,348 B2
(45) Date of Patent: Jun. 27, 2023

(54) ELECTRONIC APPARATUS AND METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Yu Nakatani, Chiba (JP); Tadanori Saito, Tokyo (JP); Atsushi Fukuda, Kawasaki (JP); Kazuaki Maruhashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 16/880,704

(22) Filed: May 21, 2020

(65) Prior Publication Data

US 2020/0374098 A1    Nov. 26, 2020

(30) Foreign Application Priority Data

May 24, 2019   (JP) ................................ 2019-097938

(51) Int. Cl.
| | | |
|---|---|---|
| *H04L 7/00* | (2006.01) | |
| *H04L 7/04* | (2006.01) | |
| *H04N 5/06* | (2006.01) | |
| *H04N 21/43* | (2011.01) | |
| *H04N 23/60* | (2023.01) | |
| *G11B 27/10* | (2006.01) | |
| *G11B 27/32* | (2006.01) | |
| *H04N 5/77* | (2006.01) | |
| *H04N 5/04* | (2006.01) | |

(52) U.S. Cl.
CPC ............ *H04L 7/0016* (2013.01); *H04L 7/041* (2013.01); *H04N 5/06* (2013.01); *H04N 21/4307* (2013.01); *H04N 5/04* (2013.01); *H04N 21/43079* (2020.08)

(58) Field of Classification Search
USPC ................................ 386/200–234, 239–248
See application file for complete search history.

(56) References Cited

U.S. PATENT DOCUMENTS

| | | | |
|---|---|---|---|
| 7,260,304 B1* | 8/2007 | Harradine | .......... G11B 27/3036 |
| 2004/0088625 A1* | 5/2004 | Shimamura | ........ G11B 27/3054 |
| 2004/0165111 A1* | 8/2004 | Hosoda | .................. G11B 27/28 |
| | | | 348/518 |
| 2005/0162546 A1* | 7/2005 | Hosoda | ................ H04N 7/0112 |
| | | | 348/E7.003 |
| 2006/0227879 A1* | 10/2006 | Ciardi | ................ H04N 21/4305 |
| | | | 375/E7.278 |
| 2019/0149702 A1* | 5/2019 | Satoh | ....................... H04N 5/06 |
| | | | 348/521 |

FOREIGN PATENT DOCUMENTS

JP          09-17166 A    1/1997

* cited by examiner

*Primary Examiner* — Hung Q Dang
(74) *Attorney, Agent, or Firm* — Cowan, Liebowitz & Latman, P.C.

(57) ABSTRACT

This invention provides an electronic apparatus which comprises a TIME-CODE terminal configured to output a time code signal which an external apparatus utilizes to perform synchronization related to a video, and a control unit configured to output a time code signal in which a bit in a predetermined field in the time code signal is set to a predetermined value, from the TIME-CODE terminal.

9 Claims, 7 Drawing Sheets

FIG. 2

| LTC BIT NUMBER | CONTENT |
|---|---|
| 0 ~ 3 | FRAME (ONES PLACE) |
| 4 ~ 7 | USER BIT FIELD 1 |
| 8 ~ 9 | FRAME (TENS PLACE) |
| 10 ~ 11 | FLAG |
| 12 ~ 15 | USER BIT FIELD 2 |
| 16 ~ 19 | SECONDS (ONES PLACE) |
| 20 ~ 23 | USER BIT FIELD 3 |
| 24 ~ 26 | SECONDS (TENS PLACE) |
| 27 | FLAG |
| 28 ~ 31 | USER BIT FIELD 4 |
| 32 ~ 35 | MINUTES (ONES PLACE) |
| 36 ~ 39 | USER BIT FIELD 5 |
| 40 ~ 42 | MINUTES (TENS PLACE) |
| 43 | FLAG |
| 44 ~ 47 | USER BIT FIELD 6 |
| 48 ~ 51 | HOURS (ONES PLACE) |
| 52 ~ 55 | USER BIT FIELD 7 |
| 56 ~ 57 | HOURS (TENS PLACE) |
| 58 ~ 59 | FLAG |
| 60 ~ 63 | USER BIT FIELD 8 |
| 64 ~ 79 | LTC SYNC WORD |

ELECTRONIC APPARATUS AND METHOD FOR CONTROLLING THE SAME, AND NON-TRANSITORY COMPUTER-READABLE STORAGE MEDIUM

BACKGROUND OF THE INVENTION

Field of the Invention

The present invention relates to an electronic apparatus, a method of controlling the same and a non-transitory computer-readable storage medium.

Description of the Related Art

In order to synchronize a plurality of electronic apparatuses (for instance, a television camera, a VTR device, or the like) that handle a moving image, two terminals of a GEN-LOCK terminal and a TIME-CODE terminal are typically used. A ternary sync signal or the like defined in the Society of Motion Picture and Television Engineers (SMPTE) standard is used at the GEN-LOCK terminal. A ternary sync signal output from one electronic apparatus is input to another electronic apparatus, and the other electronic apparatus extracts a synchronization signal from the input signal and finely adjusts its clock frequency by using a Voltage Controlled Crystal Oscillator (VCXO) or the like to match its phase with that of the electronic apparatus that has output the ternary sync signal. At the TIME-CODE terminal, a Linear Time Code (LTC) signal defined in the SMPTE standard is used, the LTC signal output from the one electronic apparatus is input to the other electronic apparatus, and the other electronic apparatus encodes the input signal and allocates an appropriate time code for each frame of video.

Miniaturization of electronic apparatuses has been required, and thus there is a technique that reduces two terminals required for synchronization between electronic apparatuses into one terminal to achieve space saving and matches phases and time codes by using only the TIME-CODE terminal. However, when the LTC signal is used to perform the phase matching, the number of synchronization signals per unit time is reduced because the number of transitions of a signal level per one frame is small compared to the ternary sync signal. Since the electronic apparatus on a side where the LTC signal is received counts intervals of the synchronization signals by using its number of clocks and finely tunes the clock frequency, there is a problem that when frequency of feedback decreases due to decrease in the number of synchronization signals per unit time, it takes time until the phase matching is completed. With a conventional apparatus, a user can operate a menu and manually set user bits of the LTC signal to a specific value, thereby increasing the transitions of the signal level per one frame and reducing the time.

On the other hand, there is also a conventional art in which information is automatically set in the user bits to exchange information between apparatuses. For instance, in Japanese Patent Laid-Open No. 9-17166, an apparatus on the output side automatically sets timer data in the user bits, and an apparatus on the input side modifies timer data of a timer circuit based on the received timer data.

However, in the conventional art described above, a user needs to manually change the user bits of the time code before the phase matching by using the time code. In addition, there is a problem that after the phase matching is completed, the user bits need to be manually returned to the original value, and thus the operation becomes complicated. In addition, in the conventional art in which the timer data is set in the user bits, there is a problem that the number of the transitions of the signal level per one frame does not necessarily increase, and it is not suitable for reducing the time required for the phase matching.

SUMMARY OF THE INVENTION

According to an aspect of the invention, there is provided an electronic apparatus, comprising: a TIME-CODE terminal configured to output a time code signal which an external apparatus utilizes to perform synchronization related to a video; and a control unit configured to output a time code signal in which a bit in a predetermined field in the time code signal is set to a predetermined value, from the TIME-CODE terminal.

According to the present invention, it is possible to reduce time required for completion of phase matching of a plurality of electronic apparatuses by using an LTC signal.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 5:
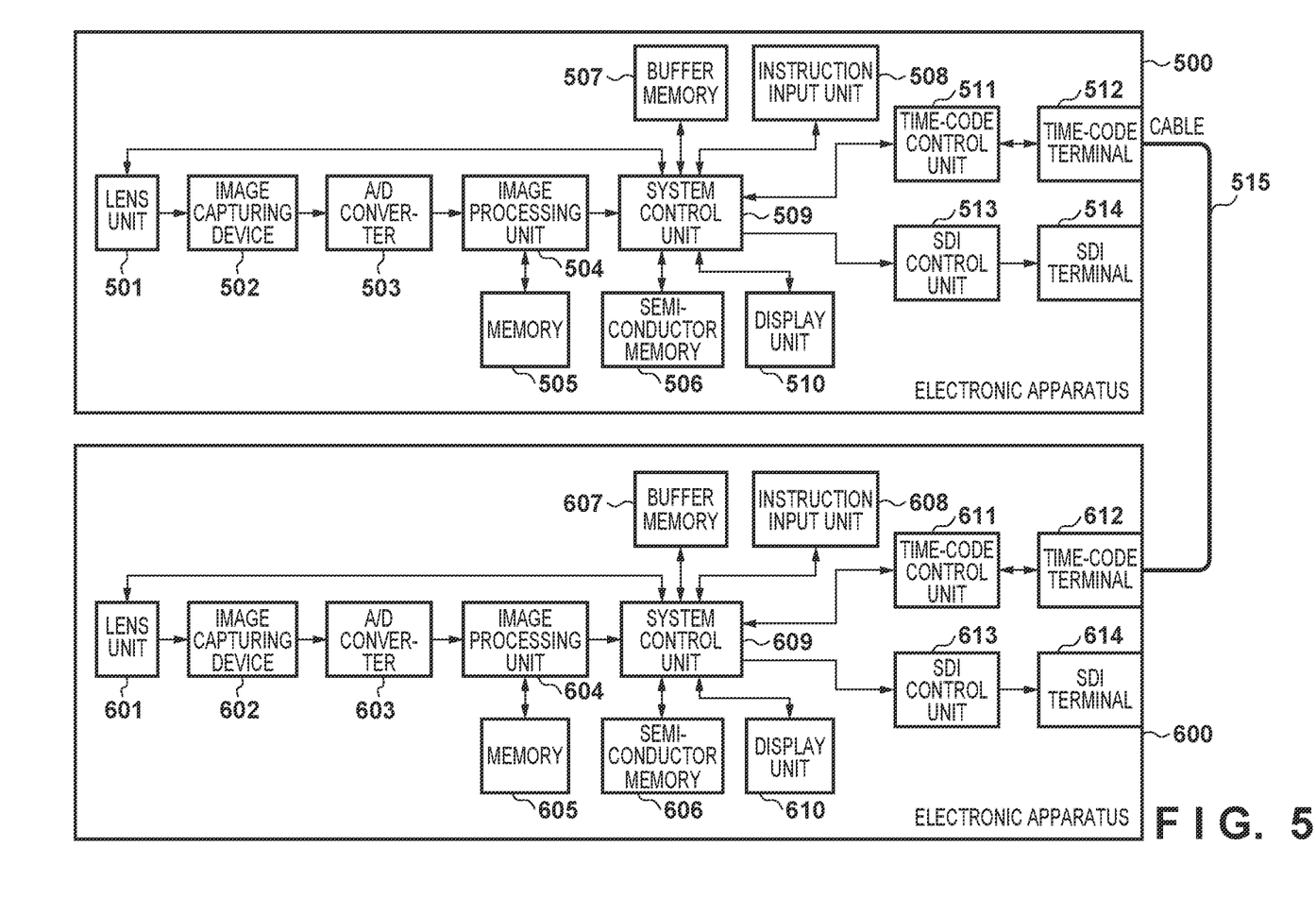
FIG. 5 is a block diagram for illustrating an example of configurations of two electronic apparatuses according to the embodiment.

FIG. 5 illustrates an example of configurations of two electronic apparatuses (an electronic apparatus 500 and an electronic apparatus 600) to which the embodiment is applied. Although a case where the electronic apparatus 500 and the electronic apparatus 600 according to the present embodiment are image capturing apparatuses (for instance, video cameras) will be explained, the electronic apparatus 500 and the electronic apparatus 600 may be electronic apparatuses other than image capturing apparatuses.

In the electronic apparatus 500, a lens-unit 501 has a diaphragm changing function, an angle of view changing function, and a focal length changing function, and captures an optical image of an object on an image capturing surface of an image capturing device 502. The image capturing device 502 converts the optical image captured by the lens-unit 501 into an electrical signal. An A/D convertor 503 converts an analog image signal from the image capturing device 502 into a digital signal. An image processing unit 504 temporarily stores the video signal from the A/D convertor 503 in a memory 505, and performs resizing processing such as predetermined pixel interpolation and image reduction, and color conversion processing on the stored video signal. A system control unit 509 includes a compression unit that compresses and encodes the video signal image-processed from the image processing unit 504 by a predetermined compression encoding system. The system control unit 509 temporarily stores the video signal compressed by the compression unit in a buffer memory 507, subsequently reads out the compressed video signal temporarily stored in the buffer memory 507 as appropriate, and stores the compressed video signal in a semiconductor memory 506 which is a recording unit. Further, the system control unit 509 can communicate with the lens-unit 501 to adjust a diaphragm, an angle of view, and a focal length. An instruction input unit 508 configured with a switch and a button converts an input from the user into an electrical signal, and notifies the system control unit 509. A captured image and a state of the electronic apparatus 500 are displayed on a displaying unit 510 which is a display device by the system control unit 509. A TIME-CODE terminal 512 is an input/output terminal, input/output settings thereof are performed by a time code control unit 511, and the TIME-CODE terminal 512 is connected to an external apparatus such as another electronic apparatus or a time code generator. The system control unit 509 can transmit and receive an LTC signal to and from the external apparatus via the time code control unit 511. Additionally, the system control unit 509 detects a transition of a signal level of the LTC signal input from the external apparatus via the time code control unit 511, and extracts a synchronization signal. The system control unit 509 compares the extracted synchronization signal with a phase of the video signal of the electronic apparatus 500, finely tunes a clock frequency by using a VCXO, and advances or returns its phase. In this manner, the external apparatus (the electronic apparatus 600 in the embodiment) can use the LTC signal transmitted from the electronic apparatus 500 to perform synchronization (phase matching) with the electronic apparatus 500. An SDI control unit 513 receives the video signal from the system control unit 509, converts the received video signal into a Serial Digital Interface (SDI) signal conforming to the SMPTE standard, and outputs the SDI signal from an SDI terminal 514.

A lens-unit 601 to an SDI terminal 614 configuring the electronic apparatus 600 have the same functions as the lens-unit 501 to the SDI terminal 514 configuring the electronic apparatus 500, and thus description thereof will be omitted.

In the above-described configuration, in the embodiment, the TIME-CODE terminal 512 of the electronic apparatus 500 and a TIME-CODE terminal 612 of the electronic apparatus 600 are connected via a cable 515. Then, the electronic apparatus 500 functions as a side where an LTC signal is transmitted from the TIME-CODE terminal 512, and the electronic apparatus 600 functions as a side where an LTC signal is received from the TIME-CODE terminal 612. Note that the transmission side and the reception side of an LTC signal are selected by the instruction input unit 508, and an instruction input unit 608.

Now, in a case where phase matching with ternary sync is performed on a video signal having a resolution of 1920× 1080 and a frame rate of 29.97 Hz, a synchronization signal can be detected once per one line. Thus, synchronization signals can be obtained 1125 times per one frame. However, in a case where an LTC signal is used for phase matching, transitions of a signal level occur only at least 93 times per one frame. In a case where the number of synchronization signals per unit time is sufficiently small with respect to a sampling frequency with which a high/low level of a signal is detected, frequency of feedback is increased as the number of synchronization signals per unit time is increased, which leads to reduce time required for completion of phase matching. That is, in order to reduce the time required for the phase matching, it is necessary to increase the number of transitions of a signal level per one frame of an LTC signal.

Figure 2:
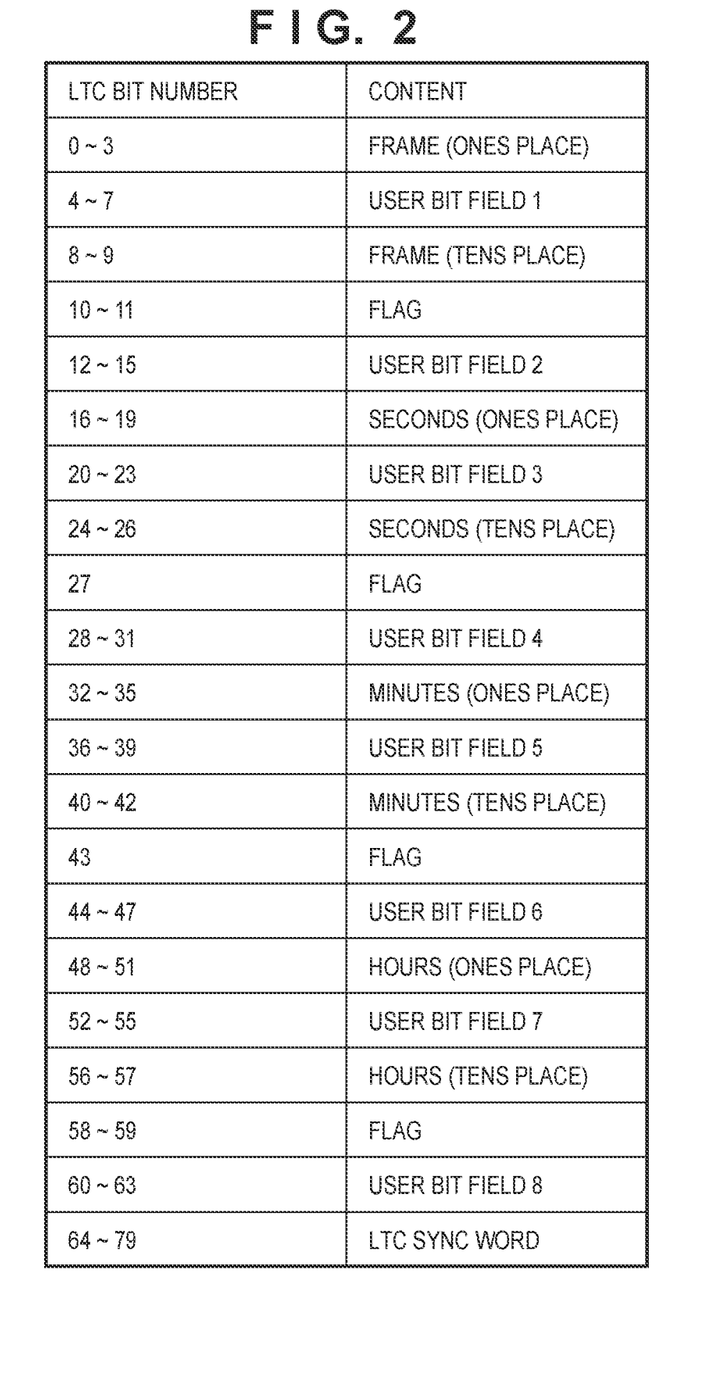
FIG. 2 is a diagram for illustrating contents of respective bits of an LTC signal.

Details of an LTC signal will be described. An LTC signal is configured with 80 bits per one frame, and contents of respective bits are shown in FIG. 2. LTC bit numbers 0 to 3 represent ones place of a frame (0 to 9 as a value), LTC bit numbers 4 to 7 represent a user bit field 1, and LTC bit numbers 8 to 9 represent tens place of the frame (0 to 2 as a value). LTC bit numbers 10 to 11 represent a flag, LTC bit numbers 12 to 15 represent a user bit field 2, LTC bit numbers 16 to 19 represent ones place of seconds (0 to 9 as a value), LTC bit numbers 20 to 23 represent a user bit field 3, LTC bit numbers 24 to 26 represent tens place of the seconds (0 to 5 as a value), and an LTC bit number 27 represents a flag. LTC bit numbers 28 to 31 represent a user bit field 4, LTC bit numbers 32 to 35 represent ones place of minutes (0 to 9 as a value), LTC bit numbers 36 to 39 represent a user bit field 5, LTC bit numbers 40 to 42 represent tens place of the minutes (0 to 5 as a value), an LTC bit number 43 represents a flag, and LTC bit numbers 44 to 47 represent a user bit field 6. LTC bit numbers 48 to 51 represent ones place of hours (0 to 9 as a value), LTC bit numbers 52 to 55 represent a user bit field 7, LTC bit numbers 56 to 57 represent tens place of the hours (0 to 2 as a value), LTC bit numbers 58 to 59 represent a flag, LTC bit numbers 60 to 63 represent a user bit field 8, and LTC bit numbers 64 to 79 represent an LTC sync word field.

In the above bit sequence, a time address may be configured with a total of 26 bits of the LTC bit numbers 0 to 3, 8 to 9, 16 to 19, 24 to 26, 32 to 35, 40 to 42, 48 to 51, and 56 to 57, and can represent one specific frame among from 00 hours 00 minutes 00 seconds frame 00 to 23 hours 59 minutes 59 seconds frame 29. The user bits are configured with a total of 32 bits of the LTC bit numbers 4 to 7, 12 to 15, 20 to 23, 28 to 31, 36 to 39, 44 to 47, 52 to 55, and 60 to 63, and a user can set any value to them. The flag bits are configured with a total of six bits of the LTC bit numbers 10 to 11, 27, 43, and 58 to 59, and are used to indicate that the frame is a drop frame or to invert a polarity of the LTC signal, or are used to indicate an attribute of the user bits, or the like. A sync word is configured with the LTC bit numbers 64 to 79 (16 bits), and is used to indicate a change point between frames. This sync word field has a unique pattern that cannot be taken in the other fields, and has value of "0011111111111101" in order from the LTC bit number 64.

Figure 3:
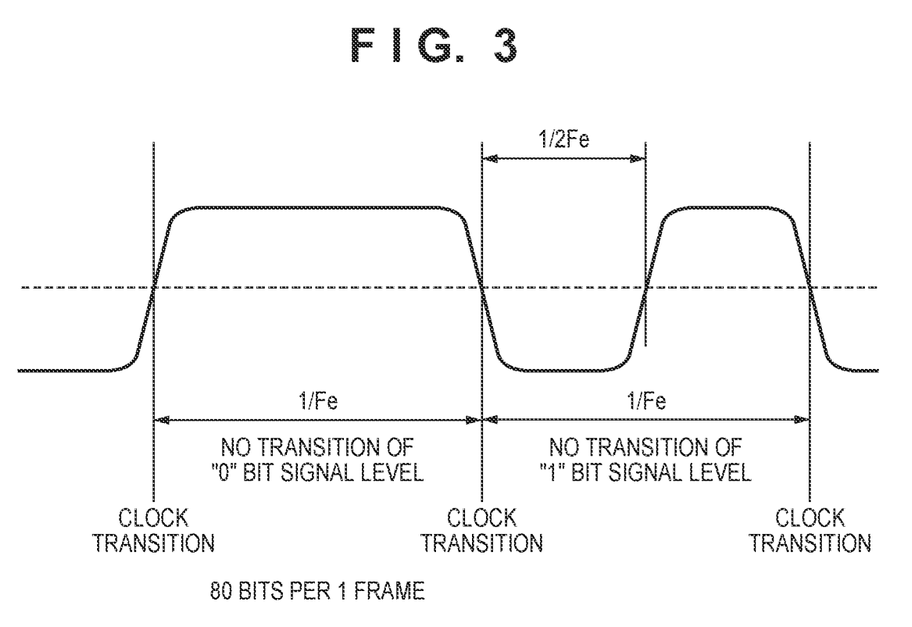
FIG. 3 is a diagram for illustrating signal waveforms of the LTC signal.

In summary, the details of the 80 bits of the LTC signal are the time address of 26 bits, the user bits of 32 bits, the flag bits of 6 bits, and the sync word of 16 bits. The LTC signal is transmitted on one signal line by using high/low levels of binary voltage values. FIG. 3 illustrates a signal waveform of the LTC signal. The LTC signal is transferred in order from the LTC bit number 0, and the signal level always transitions at a change point between bits. A modulation scheme is a bi-phase mark modulation scheme, and in a case where "0", is logically represented, the signal level does not transition during one bit period, and in a case where "1" is logically represented, the signal level transitions at the middle of one bit period. That is, in the case where "0" is logically represented, the number of transitions of the signal level for one bit period is once, and in the case where "1" is logically represented, the number of transitions of the signal level for one bit period is twice. In a case where a frame rate is 29.97 Hz, a period of "1/Fe" in FIG. 3 is 417.1 μsec (=1/(29.97×1000×80), and a period of "1/2Fe" is 208.5 μsec. As described above, the number of transitions of the signal level in the sync word is 29 times (=3×1+13×2), because the number of Os is fixed at three and the number of is fixed at 13. Thus, the number of transitions of the signal level per one frame is 93 times (=29+64) in a case where all 64 bits other than the sync word are "0" at a minimum, and is 157 times (=29+64×2) in a case where all 64 bits other than the sync word are "1" at a maximum.

Figure 1:
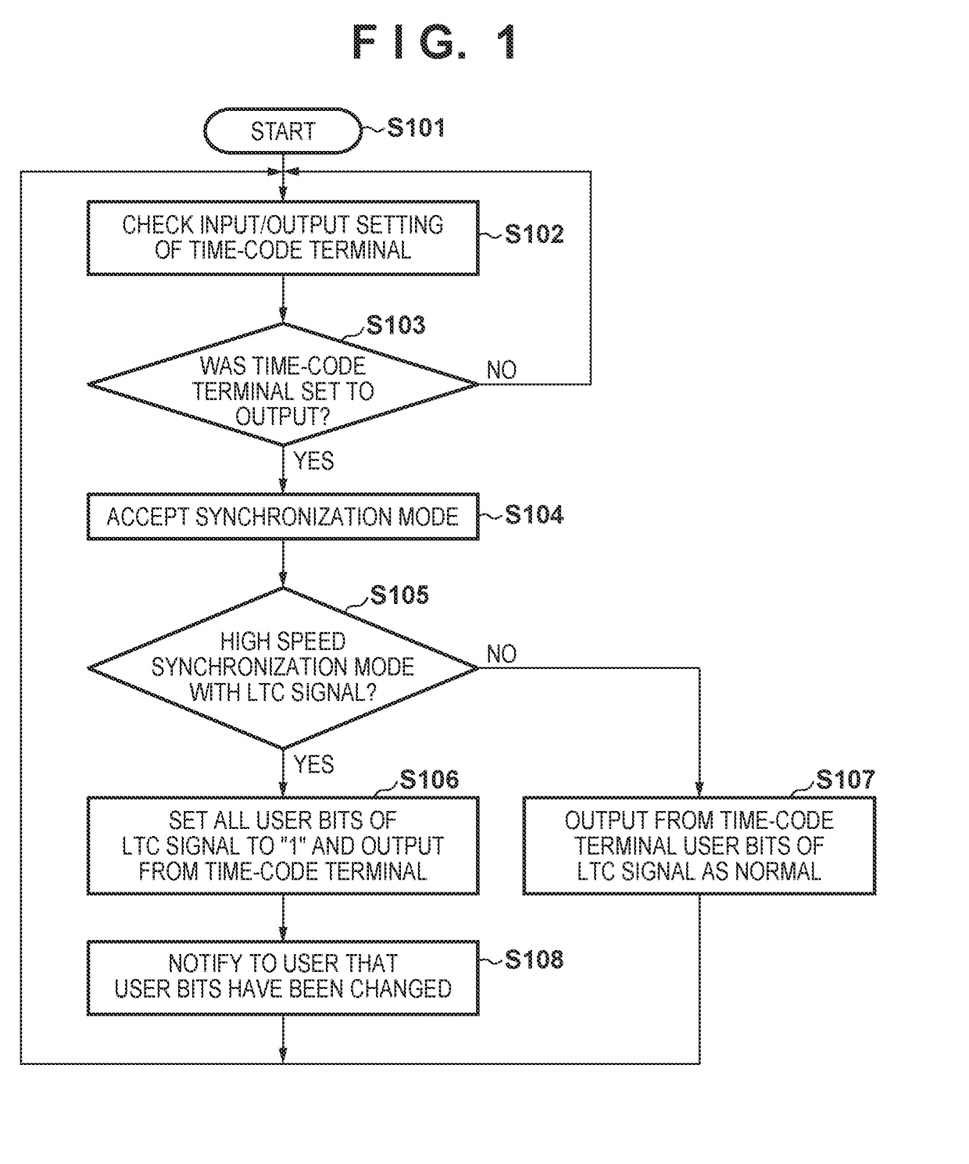
FIG. 1 is a flowchart for illustrating operations of an electronic apparatus according to a first embodiment.

FIG. 1 is a flowchart according to transmission of an LTC signal in the electronic apparatus 500 to which the present embodiment is applied. Hereinafter, with reference to the same figure, description will be given with the presumption that the electronic apparatus 500 transmits an LTC signal, and the electronic apparatus 600 receives the LTC signal.

Processing starts from S101. In S102, the system control unit 509 checks a setting of the TIME-CODE terminal 512 via the time code control unit 511. This setting follows an instruction from the instruction input unit 508, as described above.

In S103, the system control unit 509 determines whether or not the TIME-CODE terminal 512 is set to output (transmission). In S103, the system control unit 509 returns the processing to S102 in a case where the system control unit 509 determines that the TIME-CODE terminal 512 is not set to the output (is set to input (reception)). In addition, in a case where the system control unit 509 determines that the TIME-CODE terminal 512 is set to the output, the system control unit 509 advances the processing to S104.

In S104, the system control unit 509 accepts a synchronization mode specified by a user via the instruction input unit 508. In the embodiment, there are two synchronization modes with the LTC signal, a "normal mode" and a "high speed synchronization mode".

Figure 7A:
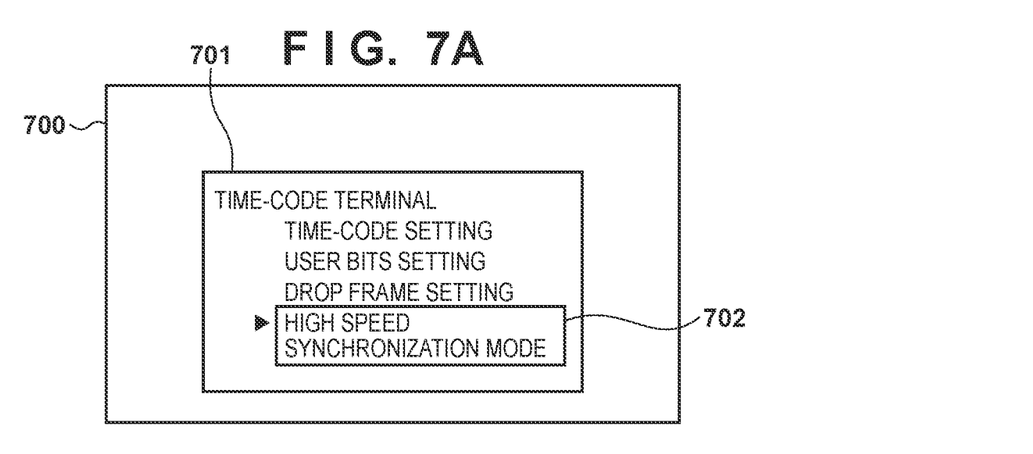
FIGS. 7A to 7C are diagrams for illustrating screen display examples in the embodiment.
Figure 7B:
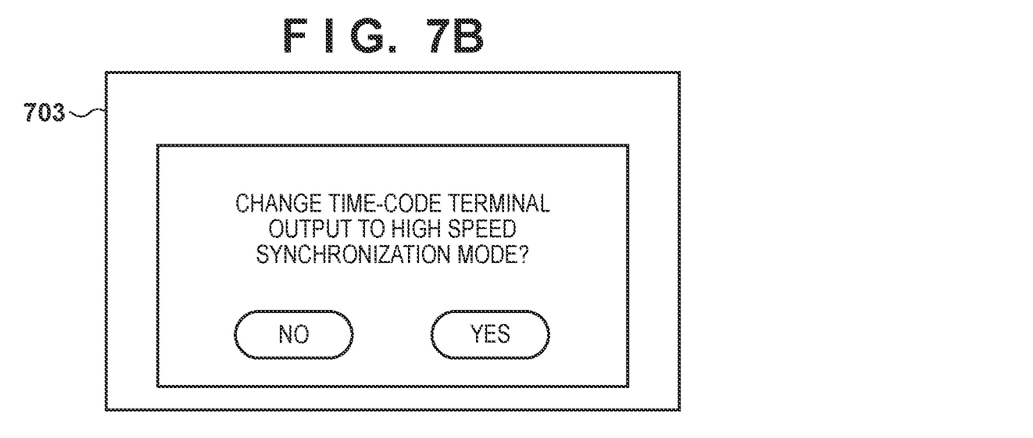
Figure 7C:
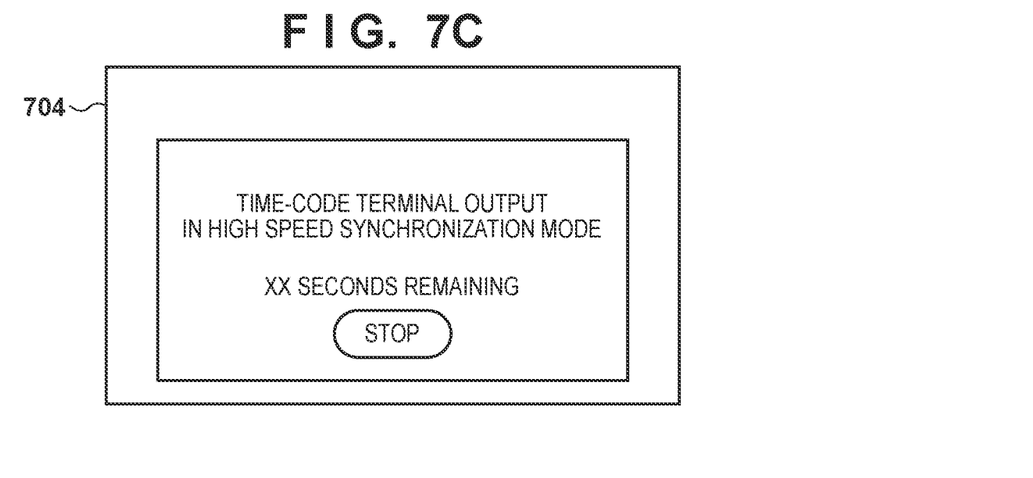

FIGS. 7A to 7C illustrate screen examples including a setting menu related to a time code on the displaying unit 510 of the electronic apparatus 500. A reference sign 700 in FIG. 7A indicates a screen of the displaying unit 510, and a reference sign 701 indicates a menu.

When the user operates the instruction input unit 508 to input a setting instruction related to a time code while the electronic apparatus 500 is operating in the normal mode, the system control unit 509 allows the setting menu 701 associated with the TIME-CODE terminal in FIG. 7A to be displayed on the displaying unit 510. Here, when the user selects a "high speed synchronization mode" 702 in the setting menu 701, the system control unit 509 allows a confirmation screen 703 in FIG. 7B to be displayed on the displaying unit 510. Note that the reason why an item of "normal mode" does not exist in the menu in FIG. 7A is that the current setting mode is the normal mode. Also, in a case where the current mode is the high speed synchronization mode, the "normal mode" is displayed as a selection item. Note that, regardless of the current mode, menu items of the "normal mode" and the "high speed synchronization mode" may be displayed so as to be selectable.

Here, it is assumed that the user operates the instruction input unit 508 to select "yes" of the confirmation screen 703. In this case, in S105, the system control unit 509 determines that the "high speed synchronization mode" with an LTC signal has been set, and advances the processing to S106.

In S106, the system control unit 509 notifies the time code control unit 511 that the "high speed synchronization mode" with an LTC signal has been set. The time code control unit 511 receives the notification and transmits a provisional LTC signal in which all of the user bits (32 bits) are set to "1" to the external (the electronic apparatus 600 in the embodiment) through the TIME-CODE terminal 512.

Then, in S108, in order to notify the user that the user bits of the LTC signal has been changed (or the provisional LTC signal is being output) through the displaying unit 510, the system control unit 509 allows a predetermined message to be displayed on the displaying unit 510 and returns the processing to S102. A screen 704 in FIG. 7C is a message example of the displaying unit 510 for notifying the user. As will be described below, remaining time may be displayed in a case of automatically returning to the "normal mode" when a predetermined time or longer passes. Furthermore, in the case where the "high speed synchronization mode" has been set, the user bits of the LTC signal are changed, but user bits of an Ancillary Time Code (ATC) superimposed on an ancillary field of an SDI signal to be output from the SDI terminal 514 are not changed.

On the other hand, in S105, in a case where "the high speed synchronization mode" is not set, the system control unit 509 advances the processing to S107. In this S107, the system control unit 509 notifies the time code control unit 511 of the normal mode. The time code control unit 511 receives the notification, does not change all the user bits of the LTC signal to "1", and outputs the normal LTC signal from the TIME-CODE terminal 512 with normal user setting values remained. Thereafter, the system control unit 509 returns the processing to S102.

As indicated above, only in a case of being specified by the user, all the user bits of the LTC signal are set to "1". As a result, 32 bits occupied by the user bits become "1" among 64 bits other than the sync word. Since the number of transitions of the sync word is 29 times as described above, it is promised that when the provisional LTC signal is adopted, the minimum number of transitions of the signal level per one frame is 125 times (=29+32×2+32). That is, the minimum number of transitions can be increased from 93 times before implementation to 125 times after implementation. Thus, time until which the electronic apparatus 600 that has received the provisional LTC signal completes phase matching can be reduced. Also, consistency and continuity of the time addresses between the two electronic apparatuses are always guaranteed even in the high speed synchronization mode with the provisional LTC signal, since the time address and the flag bits are unchanged and transmitted.

In the present embodiment, the user needs to specify to return to the normal mode from the high speed synchronization mode with the LTC signal, however it is possible to return to the normal mode after the predetermined time. Also, in the embodiment, a trigger for entering the high speed synchronization mode with the LTC signal is the instruction input from the user. However, the electronic apparatus 500 may automatically (without user operation) enter the "high speed synchronization mode" at a time when a predetermined condition, such as when a recording format (resolution, frame rate, compression scheme, or the like) of the electronic apparatus 500 is switched, when a video signal is not being recorded in the semiconductor memory 506, or when the electronic apparatus 500 is powered on, is satisfied.

When, in a received LTC signal, the time address is incremented frame by frame, but all the user bits are "1", the electronic apparatus 600 may determine that only the user bits are invalid and may hold the previously received user bits.

Second Embodiment

A second embodiment will be described. Configurations of apparatuses are the same as those of FIG. 5 illustrated in the first embodiment, and description thereof will be omitted.

Figure 4:
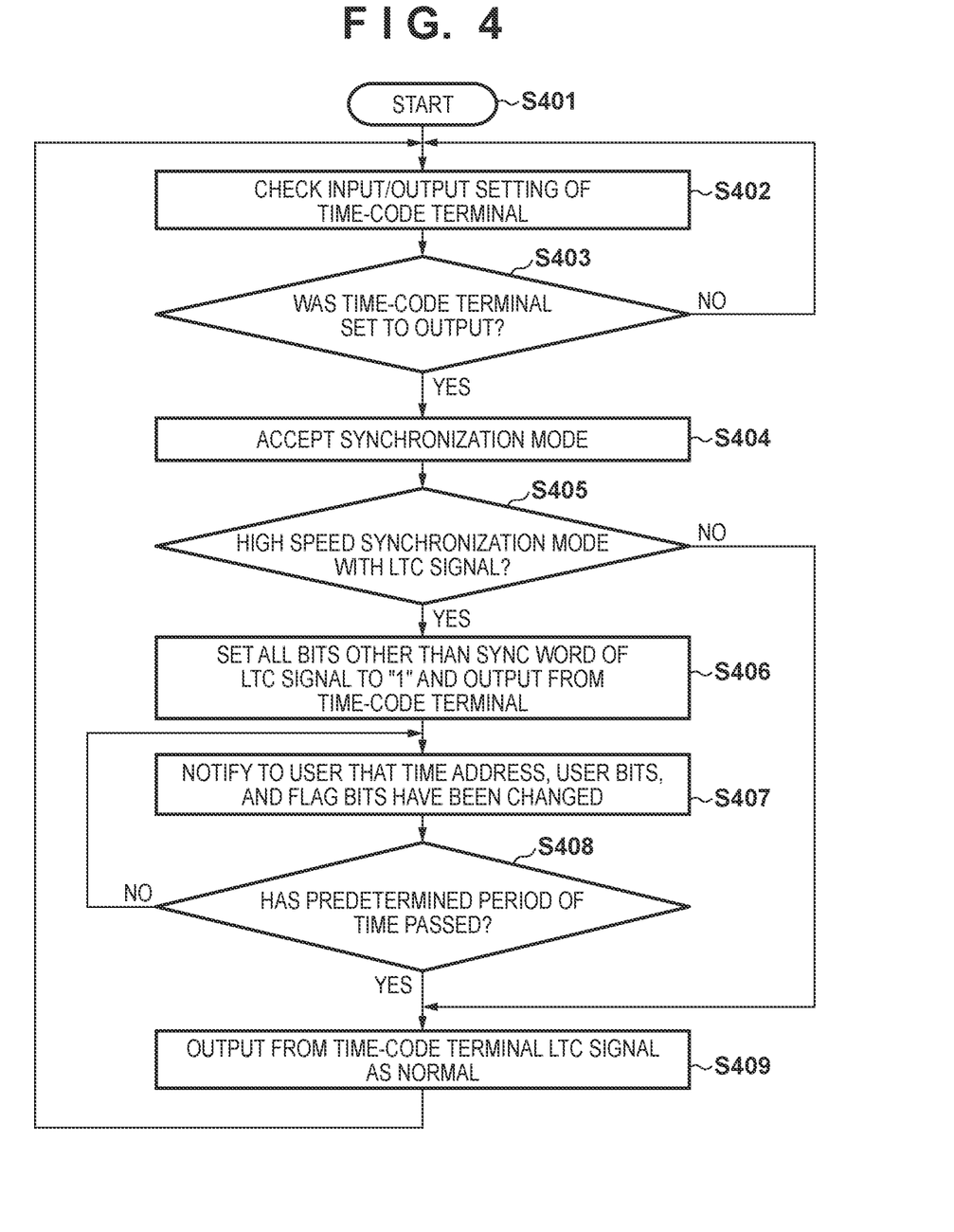
FIG. 4 is a flowchart for illustrating operations of an electronic apparatus according to a second embodiment.

FIG. 4 is a flowchart illustrating operations of the electronic apparatus 500 according to the second embodiment. Also, in the second embodiment, it is assumed that the electronic apparatus 500 transmits an LTC signal and the electronic apparatus 600 receives the LTC signal. Settings of a transmission side and a reception side are set by the instruction input units.

In the second embodiment, the minimum number of transitions of a signal level per one frame is increased compared with the first embodiment described above.

Processing starts from S401. In S402, the system control unit 509 checks a setting of the TIME-CODE terminal 512 via the time code control unit 511.

In S403, the system control unit 509 determines whether or not the TIME-CODE terminal 512 is set to output. In S403, the system control unit 509 returns the processing to S402 in a case where the system control unit 509 determines that the TIME-CODE terminal 512 is not set to the output. In addition, in a case where the system control unit 509 determines that the TIME-CODE terminal 512 is set to the output, the system control unit 509 advances the processing to S404.

In S404, the system control unit 509 accepts a synchronization mode specified by a user via the instruction input unit 508. Also, in the present embodiment, it is assumed that there are two synchronization modes, a "normal mode" and a "high speed synchronization mode". This acceptance is performed via the screens in FIGS. 7A-7C, similarly to the first embodiment.

Then, in S405, the system control unit 509 determines whether the "high speed synchronization mode" has been set or not. In a case where the system control unit 509 determines that the "high speed synchronization mode" has been set, the system control unit 509 advances the processing to S406. In S406, the system control unit 509 notifies the time code control unit 511 that the "high speed synchronization mode" has been set. The time code control unit 511 that receives the notification generates a provisional LTC signal in which all bits other than the sync word (time address, user bits, and flag bits) are set to "1", and transmits the provisional LTC signal to the external through the TIME-CODE terminal 512. Then, in S407, the system control unit 509 notifies the user that the time address, the user bits, and the flag bits of the LTC signal has been changed (or that the provisional LTC signal is being output) via the displaying unit 510, and advances the processing to S408. At this time, the time address, the user bits, and the flag bits of the LTC signal are changed, but an ATC superimposed on an ancillary field of an SDI signal to be output from the SDI terminal 514 is not changed.

In S408, the system control unit 509 repeats the processing of S407 until a predetermined period of time (a period of time sufficient for completion of phase matching on the reception side) passes (this period of time may be set as appropriate by the user). Then, after the period of time has passed, the system control unit 509 advances the processing to S409, and controls the time code control unit 511 to return the time address, the user bits, and the flag bits of an LTC signal to normal user setting values and to output a normal LTC signal from the TIME-CODE terminal 512. Thereafter, the system control unit 509 returns the processing to S402.

On the other hand, in S405, in a case where the system control unit 509 determines that the "high speed synchronization mode" has not been set, the system control unit 509 advances the processing to S409. In other words, the system control unit 509 controls the time code control unit 511 to set the LTC signal to the normal user setting values and to output the normal LTC signal from the TIME-CODE terminal 512.

As indicated above, according to the second embodiment, by outputting the provisional LTC signal in which all of the time address, the user bits, and the flag bits are "1" only for a period of time only in a case of being specified by the user, the minimum number of transitions of the signal level per one frame can be increased from 93 times before implementation to 157 times in the embodiment. As a result, time until which the electronic apparatus 600 that has received the provisional LTC signal completes phase matching can be reduced compared with the first embodiment. The provisional LTC signal to be transmitted is not valid data because the time address is not incremented frame by frame, and is preferably returned to the original and normal LTC signal after the predetermined period of time has passed.

Third Embodiment

A third embodiment will be described. Configurations of apparatuses are the same as those of FIG. 5 illustrated in the first embodiment, and description thereof will be omitted.

Figure 6:
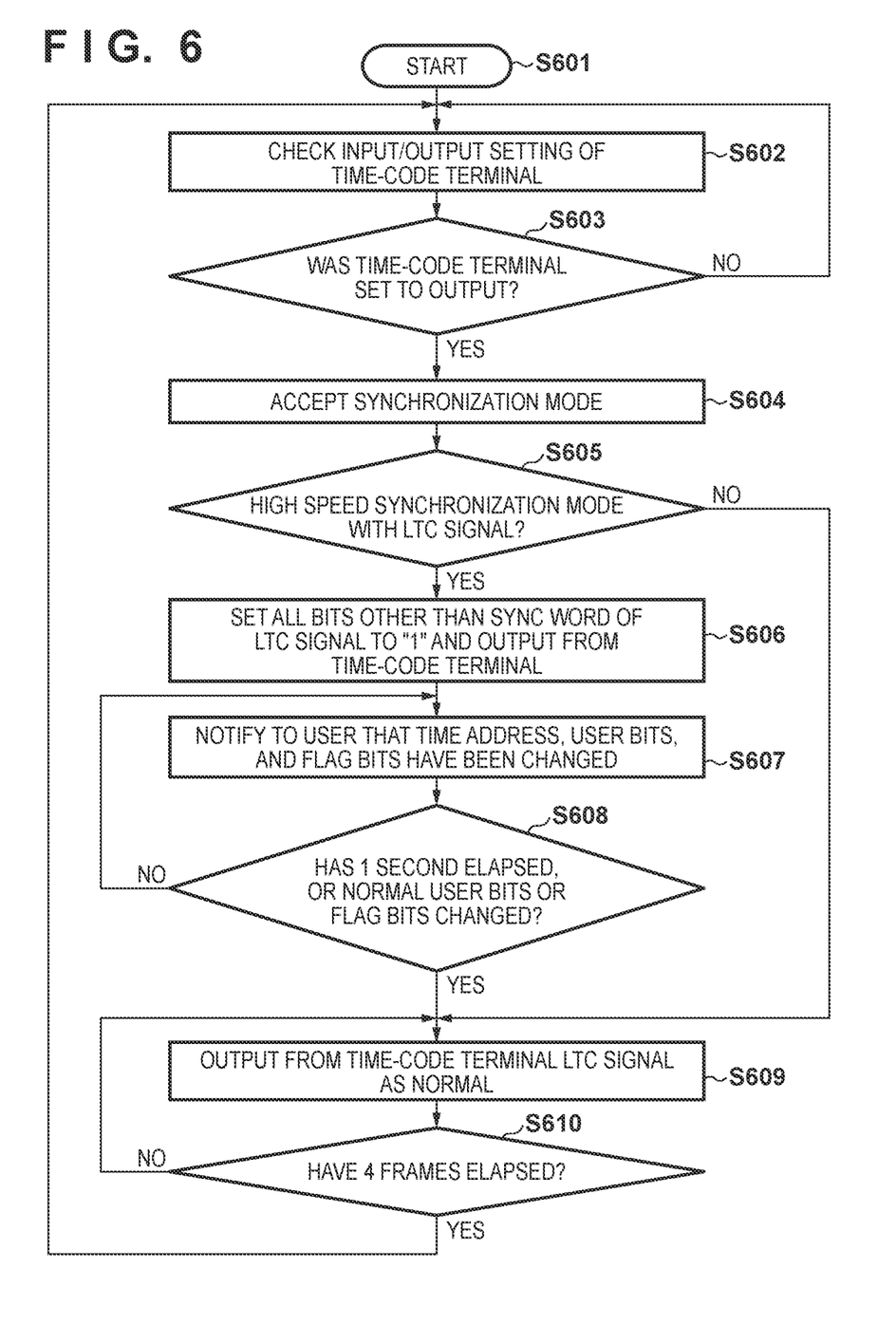
FIG. 6 is a flowchart for illustrating operations of an electronic apparatus according to a third embodiment.

FIG. 6 is a flowchart illustrating operations of the electronic apparatus 500 according to the third embodiment. Also, in the third embodiment, it is assumed that the electronic apparatus 500 transmits an LTC signal and the electronic apparatus 600 receives the LTC signal. Settings of a transmission side and a reception side are set by the instruction input units.

In the above-described second embodiment, the bits in all the fields (64 bits) other than the sync word (16 bits) in the provisional LTC signal are "1". The period of time when the provisional LTC signal is being transmitted, a valid time code cannot be transmitted, so that even when the user bits and the flag bits are updated during that period, they cannot be reflected. In the third embodiment, the update of the user bits and the flag bits can be reflected.

Processing starts from S601. In S602, the system control unit 509 checks a setting of the TIME-CODE terminal 512 via the time code control unit 511.

In S603, the system control unit 509 determines whether or not the TIME-CODE terminal 512 is set to output. In S603, the system control unit 509 returns the processing to S602 in a case where the system control unit 509 determines that the TIME-CODE terminal 512 is not set to the output. In addition, in a case where the system control unit 509 determines that the TIME-CODE terminal 512 is set to the output, the system control unit 509 advances the processing to S604.

In S604, the system control unit 509 accepts a synchronization mode specified by a user via the instruction input unit 508. Also, in the present embodiment, it is assumed that there are two synchronization modes, a "normal mode" and a "high speed synchronization mode". This acceptance is performed via the screens in FIGS. 7A to 7C similarly to the first embodiment.

Then, in S605, the system control unit 509 determines whether the "high speed synchronization mode" has been set or not. In a case where the system control unit 509 determines that the "high speed synchronization mode" has been set, the system control unit 509 advances the processing to S606. In S606, the system control unit 509 notifies the time code control unit 511 that the "high speed synchronization mode" has been set. The time code control unit 511 that receives the notification generates a provisional LTC signal in which all bits other than the sync word (time address, user bits, and flag bits) are set to "1", and transmits the provisional LTC signal to the external (electronic apparatus 600) through the TIME-CODE terminal 512.

In S607, the system control unit 509 notifies the user that the time address, the user bits, and the flag bits of the LTC signal has been changed (or that the provisional LTC signal is being output) via the displaying unit 510, and advances the processing to S608. Note that at this time, the time address, the user bits, and the flag bits of the LTC signal are changed, but an ATC superimposed on an ancillary field of an SDI signal to be output from the SDI terminal 514 is not changed.

In S608, the system control unit 509 determines whether one second has passed after the provisional LCT signal in which all the bits other than the sync word are changed to "1" is being output, or a change to the normal user bits or flag bits has been made. Then, the system control unit 509 continues the processing of S607 until any one of the conditions is satisfied.

Additionally, in a case where one second has passed after the provisional LTC signal has been output, or the user bits or flag bits have been changed by the user, the system control unit 509 advances the processing to S609.

In this S609, the system control unit 509 returns the LTC signal of the time code control unit 511 to normal user setting values, and causes the normal LTC signal to be output from the TIME-CODE terminal 512. Thereafter, in S610, the system control unit 509 continues S609 until four frames pass after returning the LTC signal to the normal user setting values, and returns the processing to S602 after the four frames pass.

On the other hand, in S605, in a case where the system control unit 509 determines that the "high speed synchronization mode" has not been set, the system control unit 509 advances the processing to S609, and controls the time code control unit 511 to set the LTC signal to the normal user setting values and to output the normal LTC signal from the TIME-CODE terminal 512. User bits are used to record a shooting date, a shooting time, a reel number, and a scene number in many cases. Among these, the shooting time has the highest update frequency, and is updated once per one second. In the present third embodiment, at the time when one second passes or when the user bits and the flag bits are updated by the user after the electronic apparatus 500 sets all the bits other than the sync word of the LTC signal to "1", the electronic apparatus 500 transmits the normal LTC signal set by the user only for four frames. In other frames, the LTC signal in which all the bits other than the sync word are set to "1" is transmitted. Here, the "four frames" are set by assuming that the electronic apparatus 600 on the reception side is designed such that the electronic apparatus 600 determines that an LTC signal in which a time address is correctly incremented four consecutive times frame by frame is valid, and imports the LTC signal therein. In a case where an apparatus on the reception side determines that an LTC signal is valid when a time address is consecutively incremented N times frame by frame, it is preferable to consecutively transmit a normal LTC signal set by a user N times. Once the electronic apparatus 600 acquires the valid LTC signal, when an invalid LTC signal comes next, the electronic apparatus 600 increments the time address therein while maintaining the user bits and the flag bits, and thus can maintain the valid LTC signal therein. For instance, a case is considered in which the user bits of the LTC signal output by the electronic apparatus 500 are set to a shooting time and are updated once per one second, and the electronic apparatus 600 determines that an LTC signal in which a time address is consecutively correctly incremented four times frame by frame is valid. It is optimum that the electronic apparatus 500 consecutively transmits an LTC signal according to a setting by the user in only first four frames in a cycle of one second, and transmits an LTC signal in which all bits other than the sync word are set to "1" in the other frames. By doing so, the electronic apparatus 600 can receive an LTC signal having the maximum number of transitions of a signal level and maintain a correct time code according to the setting by the user.

In a case where a frame rate is 30 Hz, only in a case of being specified by the user, all of a time address, user bits, and flag bits of an LTC signal are set to "1" only in four frames, and the user bits are updated once per one second. The minimum number of transitions of a signal level per one frame can be increased from 93 times before implementation to 148.47 times after implementation, and time required for completion of phase matching on a side where an LTC signal is received can be reduced compared with the first embodiment. In addition, when update frequency of user bits and flag bits is smaller than or equal to about once per one second, it is possible to ensure that LTC signals on a transmission side and a reception side match.

Although the above embodiments have been described in which both the electric apparatuses 500 and 600 are video cameras, it should be understood that they are merely illustrative. For instance, a third electronic apparatus (for instance, a VTR apparatus) that transmits an LTC signal may be provided, and both of the electronic apparatuses 500 and 600 may be set as the reception side of the LTC signal, and the number of electronic apparatuses is not particularly limited.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097938, filed May 24, 2019, which is hereby incorporated by reference herein in its entirety.

What is claimed is:

1. An electronic apparatus, comprising:
   an image capturing unit;
   a TIME-CODE terminal configured to output a time code signal which an external apparatus utilizes to perform synchronization related to a video, the time code signal including first fields storing data specifying a frame, second fields storing data set by a user and a third field storing a sync word;
   a determination unit configured to determine whether an instruction input of high speed synchronization is performed by a user or a predetermined condition is satisfied; and
   a control unit configured to, in accordance with a result of the determination by the determination unit, generate the time code signal and output the generated time code signal to the external apparatus via the TIME-CODE terminal,
   wherein the control unit,
   in a case that the determination unit determines neither the instruction input of high speed synchronization is performed by the user nor the predetermined condition is satisfied, generates the time code signal in which the second fields store data set by the user, and
   in a case that the determination unit determines that the instruction input of high speed synchronization is performed by the user or the predetermined condition is satisfied, generates the time code signal in which all of bits in the second fields are set as "1" regardless of the data set by the user.

2. The apparatus according to claim 1, wherein the time code signal is a Linear Time Code (LTC) signal conforming to the Society of Motion Picture and Television Engineers (SMPTE) standard.

3. The apparatus according to claim 2, wherein in a case that the determination unit determines that the instruction of high speed synchronization is performed by the user or the predetermined condition is satisfied, the control unit generate the time code signal in which all of bits in the first and second fields other than third field in the LTC signal are set as "1".

4. The apparatus according to claim 1, further comprising:
   an output terminal different from the TIME-CODE terminal, wherein
   the control unit is configured to control so as to output, from the output terminal, the time code signal in which the second field has the data set by the user regardless of the result of the determination by the determination unit.

5. The apparatus according to claim 1, wherein, the predetermined condition includes at least one of a time when the electronic apparatus is turned on, and a time when a resolution, a frame rate, and a compression method are switched by the image capturing unit.

6. The apparatus according to claim 1, wherein the control unit is configured to generate and output the time code signal in which all of bits in the second fields are set as "1" for a predetermined period of time, and after then generate and output the time code in which the second fields store the data set by the user.

7. The apparatus according to claim 6, further comprising:
   a displaying unit configured to display a message indicating that the time code signal for phase matching is being output for the predetermined period of time.

8. A method for controlling an electronic apparatus having an image capturing unit and a TIME-CODE terminal configured to output a time code signal which an external apparatus utilizes to perform synchronization related to a video, the time code signal including first fields storing data specifying a frame, second fields storing data set by a user and third field storing a sync word, the method comprising:
   determining whether an instruction input of high speed synchronization is performed by a user; and
   in accordance with a result of the determination in the determining, generating the time code signal and outputting the generated time code signal to the external apparatus via the TIME-CODE terminal,
   wherein, in a case that a predetermined condition is not satisfied and it is determined in the determining that the instruction input of high speed synchronization is not performed by the user, the time code signal in which the second fields store data set by the user is generated, and
   in a case that it is determined in the determining that the instruction input of high speed synchronization is performed by the user, the time code signal in which all of bits in the second fields are set as "1" regardless of the data set by the user is generated.

9. A non-transitory computer-readable storage medium storing a program which, when read and executed by a computer of an electronic apparatus having an image capturing unit and a TIME-CODE terminal configured to output a time code signal which an external apparatus utilizes to perform synchronization related to a video, causes the electronic apparatus to execute the steps of a method for controlling the electronic apparatus, the time code signal including first fields storing data specifying a frame, second fields storing data set by a user and third field storing a sync word, the method comprising:
   determining whether an instruction input of high speed synchronization is performed by a user or a predetermined condition is satisfied; and
   in accordance with a result of the determination in the determining, generating the time code signal and outputting the generated time code signal to the external apparatus via the TIME-CODE terminal,
   wherein, in a case that it is determined in the determining neither the instruction input of high speed synchronization is performed by the user nor the predetermined condition is satisfied, the time code signal in which the second fields store data set by the user is generated, and in a case that it is determined in the determining that the instruction input of high speed synchronization is performed by the user or the predetermined condition is satisfied, the time code signal in which all of bits in the second fields are set as "1" regardless of the data set by the user is generated.

* * * * *